United States Patent [19]
Janotik et al.

[11] Patent Number: 5,213,386
[45] Date of Patent: May 25, 1993

[54] SPACE FRAME CONSTRUCTION

[75] Inventors: Adam M. Janotik, Gross Ile; Lawrence P. Kazyak, Novi, both of Mich.

[73] Assignee: Ford Motor Company, Dearborn, Mich.

[21] Appl. No.: 880,784

[22] Filed: May 11, 1992

[51] Int. Cl.$^5$ .............................................. B62D 27/02
[52] U.S. Cl. ........................... 296/29; 52/731.6; 280/785; 296/30; 296/203; 296/204; 296/205; 296/209; 403/267; 403/403
[58] Field of Search .................. 296/29, 30, 197, 203, 296/204, 205, 209, 900; 280/785, 797, 798, 800; 52/280, 281, 282, 730, 731, 732; 403/265, 267, 381, 403

[56] References Cited

U.S. PATENT DOCUMENTS

| | | | |
|---|---|---|---|
| 2,640,443 | 6/1953 | Schieler et al. | 105/404 |
| 3,472,301 | 10/1969 | Pearce, Jr. | 411/258 |
| 4,205,844 | 6/1980 | Gombas | 273/73 H |
| 4,355,844 | 10/1982 | Fantini et al. | 296/205 |
| 4,428,599 | 1/1984 | Jahnle | 296/203 X |
| 4,471,519 | 9/1984 | Capello et al. | 29/460 |
| 4,552,400 | 11/1985 | Harasaki et al. | 296/185 |
| 4,618,163 | 10/1986 | Hasler et al. | 280/785 |
| 4,660,345 | 4/1987 | Browning | 52/648 |
| 4,726,166 | 2/1988 | DeRees | 52/694 |
| 4,807,925 | 2/1989 | Sakamoto et al. | 296/194 |
| 4,810,028 | 3/1989 | Henricks | 296/203 X |
| 4,836,600 | 6/1989 | Miyazaki et al. | 296/197 |
| 4,887,862 | 12/1989 | Bassi | 296/204 |
| 4,900,083 | 2/1990 | Kumasaka et al. | 296/197 |
| 4,912,826 | 4/1990 | Dixon et al. | 29/281.1 |
| 4,968,087 | 11/1990 | Goria | 296/197 |
| 4,976,490 | 12/1990 | Gentle | 296/183 |
| 4,986,597 | 1/1991 | Clausen | 296/205 |

FOREIGN PATENT DOCUMENTS

| | | | |
|---|---|---|---|
| 3119666 | 1/1982 | Fed. Rep. of Germany | 296/203 |
| 3811427 | 10/1989 | Fed. Rep. of Germany | |
| 4679 | 8/1987 | PCT Int'l Appl. | |

OTHER PUBLICATIONS

"Light Alloys in Car Construction", *The Autocar*, Feb. 17, 1950, pp. 189-190.

*Primary Examiner*—Russell D. Stormer
*Assistant Examiner*—Andrew C. Pike
*Attorney, Agent, or Firm*—Daniel M. Stock; Roger L. May

[57] ABSTRACT

A space frame for an automotive vehicle includes a plurality of hoop-shaped structural members and a structure disposed on adjacent portions of the structural members for allowing nesting engagement therebetween to form a substantially flush outer surface between the structural members. The structure includes at least one shoulder portion and at least one extension portion on one of the structural members.

17 Claims, 1 Drawing Sheet

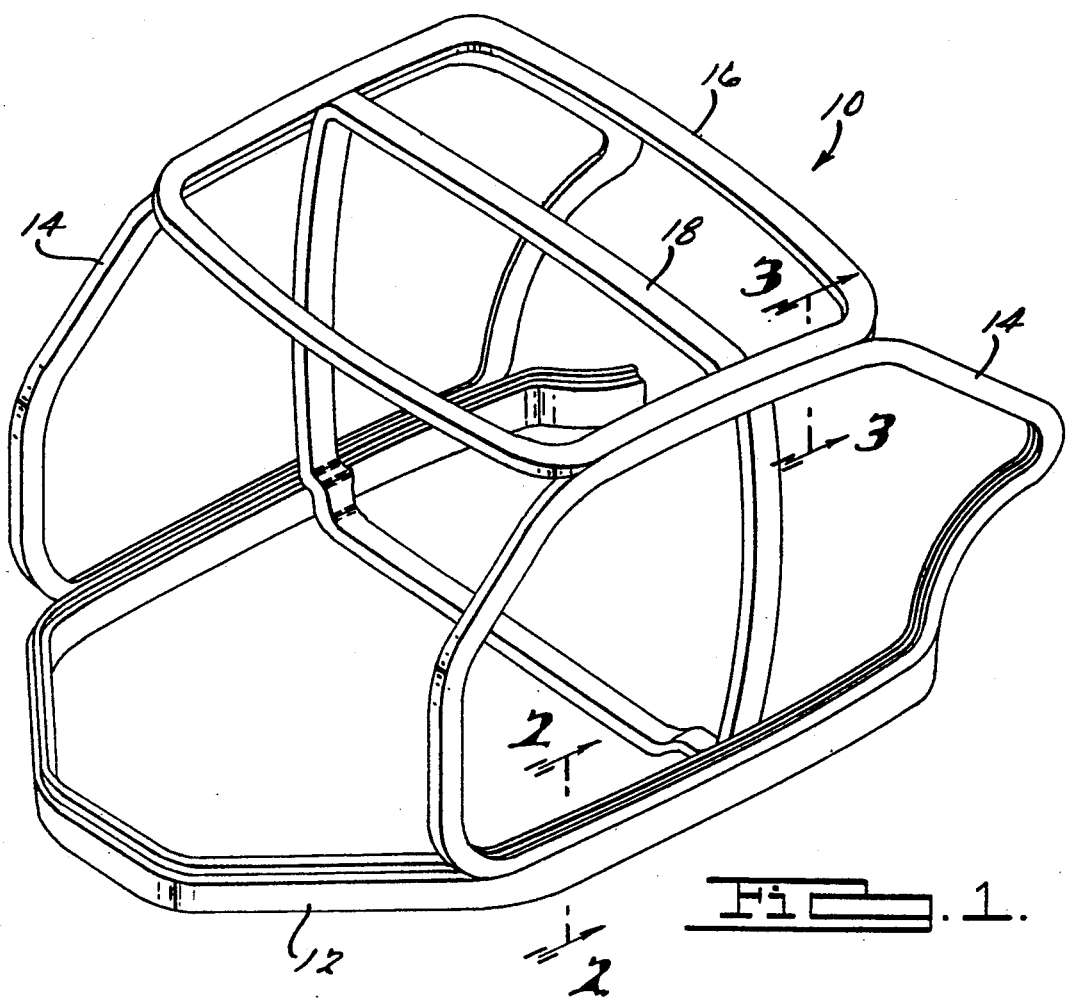
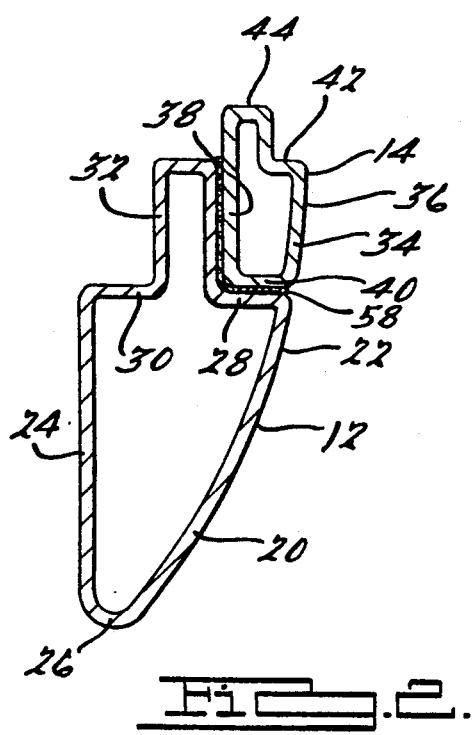
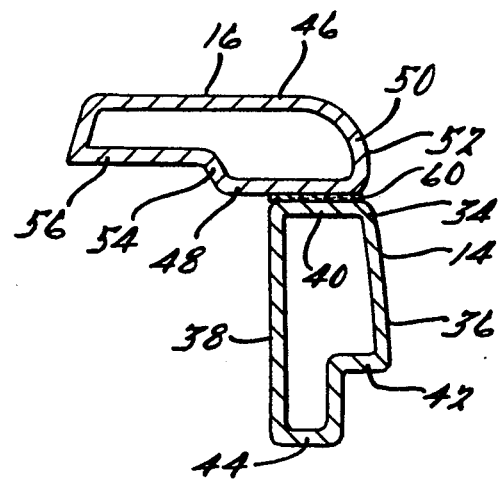

SPACE FRAME CONSTRUCTION

BACKGROUND OF THE INVENTION

1. Field Of The Invention

The present invention relates generally to frame structures for automotive vehicles, and more specifically for the construction of such frames from tubular members.

2. Description Of Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined by fixed connectors to define the general shape of the vehicle. While this approach provides a distinct advantage in weight and in the tooling cost of manufacturing over the conventional fabrication of unibody construction through massive stampings, it suffers from the disadvantage that the connectors utilized for joining the tubular components together tend to be massive and expensive to fabricate and assemble. This approach also suffers from the disadvantage that it is not flexible to allow frequent product changes Further, this approach suffers from the disadvantage of not allowing for common and interchangeable components between various automotive model lines.

SUMMARY OF THE INVENTION

Accordingly, the present invention is a space frame for an automotive vehicle including a plurality of hoop-shaped structural members and means disposed on adjacent portions of the structural members for allowing nesting engagement therebetween to form a substantially flush outer surface between the structural members.

One advantage of the present invention is that a space frame is provided for an automotive vehicle. Another advantage of the present invention is that the space frame can be made with either an aluminum or steel material. Yet another advantage of the present invention is that the space frame construction provides manufacturing flexibility by allowing inexpensive product changes, high commonality, and interchangeability between automotive model lines. A further advantage of the present invention is that the space frame construction reduces facilities and tooling investment to a fraction of traditional levels resulting in lower cost of fabrication and assembly.

Other objects, features, and advantages of the present invention will be readily appreciated as the same becomes better understood after reading the following description taken in conjunction with the accompanying drawings.

BRIEF DESCRIPTION OF THE DRAWINGS

FIG. 1 is a perspective view of a space frame according to the present invention.

FIG. 2 is a sectional view taken along line 2—2 of FIG. 1.

FIG. 3 is a sectional view taken along line 3—3 of FIG. 1.

DESCRIPTION OF THE PREFERRED EMBODIMENT(S)

Turning now to the drawings and in particular to FIG. 1 thereof, a space frame 10 according to the present invention is illustrated for an automotive vehicle. The space frame 10 includes a base member 12 and a pair of side members 14 mounted on the base member 12. The space frame 10 also includes a top member 16 mounted on the side members 14 and a cross member 18 interconnected to the base member 12, side members 14, and top member 16. It should be appreciated that the space frame 10 may include other structural members (not shown).

The base member 12, side members 14, top member 16, and cross member 18 are formed as preshaped hoops or generally hoop-shaped structural members. The structural members of the space frame 10 are tubular members extruded from a metal material such as an aluminum or steel material. It should be appreciated that other suitable materials may be used.

Referring to FIGS. 2 and 3, the structural members are configured to allow nested engagement therebetween to form a substantially flush outer surface between the structural members. The base member 12 has an outer side portion 20 with an outer surface 22 and an inner side portion 24 interconnected by a base portion 26. The outer side portion 20 and base portion 26 are arcuate in shape and the inner side portion 24 is linear in shape to form a generally V-shaped cross section. The base member 12 also has a pair of shoulder portions 28 and 30 extending inwardly and generally perpendicular to the outer side portion 20 and inner side portion 24, respectively. The base member 12 further has an extension portion 32 of a generally inverted U shape connected to the shoulder portions 28 and 30. It should be appreciated that the portions 20, 24, 26, 28, 30, 32 are integral and formed as one-piece.

The side member 14 has an outer side portion 34 with an outer surface 36 and an inner side portion 38 interconnected by a base portion 40. The outer side portion 34 is arcuate in shape and the inner side portion 38 and base portion 40 are linear in shape to form a generally U shape cross section. The side member 14 also has a shoulder portion 42 extending inwardly and generally perpendicular to the outer side portion 34. The side member 14 further has an extension portion 44 of a generally inverted U-shape connected to the shoulder portion 42 and inner side portion 38. It should be appreciated that the portions 34, 38, 40, 42, 44 are integral and formed as one-piece.

The top member 16 has an outer side portion 46 and an inner side portion 48 interconnected by a base portion 50 having an outer surface 52. The base portion 50 is arcuate in shape and the outer and inner side portions 46, 48 are linear in shape to form a generally C shape cross section. The top member 16 also has a shoulder portion 54 extending inwardly from the inner side portion 48. The top member 16 further has an extension portion 56 of a generally inverted U shape connected to the shoulder portion 54 and outer side portion 46. It should be appreciated that the portions 46, 48, 50, 54, 56 are integral and formed as one-piece.

In operation, the structural members of the space frame 10 are extruded in straight sections. The shoulder portion 28 of the base member 12 is formed of a width sufficient to receive and nest the inner side portion 38 and base portion 40 of the side member 14, which has a width which is less than the width of the shoulder portion 28, such that the outer surface 36 of the side member 14 is substantially flush or continuous with the outer surface 22 of the base member 12. As illustrated in FIG. 2, the outer surfaces 36 and 22 form a generally smooth and continuous contoured outer surface.

Similarly, the base portion 40 of the side member 14 and the inner side portion 48 of the top member 16 are formed of a width sufficient to allow the top member 16, which has a width which is greater than the width of the base portion 40, to nest on the side member 14 such that the outer surface 52 of the top member 16 is substantially flush or continuous with the outer surface 36 of the side member 14. As illustrated in FIG. 3, the outer surfaces 52 and 36 form a generally smooth and continuous contoured outer surface.

Once the structural members have been extruded in straight sections, the structural members are formed or bent to predetermined shapes as illustrated in FIG. 1 by conventional equipment and methods. Preferably, the side, top, and cross members 14, 16, 18 form closed hoop shapes. The base member 12 may have an open hoop shape or a closed hoop shape as desired. The structural members of the space frame 10 may be closed by using an adhesive, welding, or other suitable means.

During assembly, the side members 14 are mounted on the base member 12 such that the base portion 40 contacts the shoulder portion 28 and the inner side portion 38 contacts the extension portion 32. It should be appreciated that an adhesive 58 may be disposed between the side members 14 and base member 12 to secure the side members 14 to the base member 12.

Next, either the cross member 18 may be mounted on the base member 12 and contact the side members 14 or the top member 16 may be mounted on the side members 14. The top member 16 is mounted such that the inner side portion 48 contacts the base portion 40. It should be appreciated that an adhesive 60 may be disposed between the side members 14, top member 16, and cross 15 member 18 to secure these structural members together. It should also be appreciated that the cross member 18 or operator may locate the top member 16 such that the outer surface 52 is substantially flush with the outer surface 36 of the side member 14.

Accordingly, the present invention eliminates connectors by nesting together hoop shaped structural members to form the space frame 10. Also, the adhesive acts as a primary bonding agent for securing the structural members together.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A space frame for an automotive vehicle comprising:
   a plurality of hoop-shaped structural members; and
   means disposed on adjacent portions of said structural members for allowing nesting engagement therebetween to form a substantially flush outer surface between said structural members;
   wherein one of said structural members comprises a first extrusion having a first outer surface and said nesting means comprises at least one generally linear shoulder portion and at least one generally linear extension portion extending perpendicular from said shoulder portion.

2. A space frame as set forth in claim 1 wherein another of said structural members comprises a second extrusion having a second outer surface and said nesting means further comprises a nesting portion with a width less than said shoulder portion such that said second outer surface is substantially flush with said first outer surface.

3. A space frame as set forth in claim 2 wherein said second extrusion has at least one extension portion.

4. A space frame as set forth in claim 3 further including means for securing said structural members together.

5. A space frame as set forth in claim 4 wherein said securing means comprises an adhesive disposed between said structural members.

6. A space frame as set forth in claim 5 wherein said structural members are made of an aluminum material.

7. A space frame for an automotive vehicle comprising:
   a plurality of hoop-shaped extruded structural members; and
   means disposed on adjacent portions of said extruded structural members for allowing nesting engagement therebetween to form a substantially flush outer surface between said extruded structural members;
   wherein one of said extruded structural members comprises a base member having a first outer surface and said nesting means comprises generally straight shoulder portions and a generally U-shaped extension portion extending perpendicular from said shoulder portion.

8. A space frame as set forth in claim 7 wherein another of said extruded structural members comprises a side member having a second outer surface and said nesting means further comprises a nesting portion with a width less than one of said shoulder portions such that said second outer surface is substantially flush with said first outer surface.

9. A space frame as set forth in claim 8 wherein another of said extruded structural members comprises a top member having a third outer surface and said nesting means further comprises a base portion on said side member, said top member having a nesting portion with a width greater than said base portion such that said third outer surface is substantially flush with said second outer surface.

10. A space frame as set forth in claim 7 further including means for securing said extruded structural members together.

11. A space frame as set forth in claim 10 wherein said securing means comprises an adhesive disposed between said extruded structural members.

12. A space frame as set forth in claim 7 wherein said extruded structural members are made of an aluminum material.

13. A space frame as set forth in claim 7 wherein said extended structural members are made of a steel material.

14. A space frame for an automotive vehicle comprising:
- a plurality of hoop-shaped extruded structural members;
- means disposed on adjacent portions of said extruded structural member for allowing nesting engagement therebetween to form a substantially flush outer surface between said extruded structural members;
- one of said extruded structural members comprising a base member having a generally arcuate first outer surface and generally straight shoulder portions and a generally U-shaped extension portion extending perpendicular from said shoulder portions;
- another of said extruded structural members comprising a side member having a generally arcuate second outer surface and a nesting portion with a width greater than one of said shoulder portions such that said second outer surface is substantially flush with said first outer surface;
- said side member including a generally U-shaped extension portion; and
- an adhesive disposed between said base and side members for securing said base and side members together.

15. A space frame as set forth in claim 14 wherein said base and side members are made of an aluminum material.

16. A space frame as set forth in claim 14 wherein said base and side members are made of a steel material.

17. A space frame as set forth in claim 14 wherein said base and side members are tubular members.

* * * * *